Patented July 21, 1942

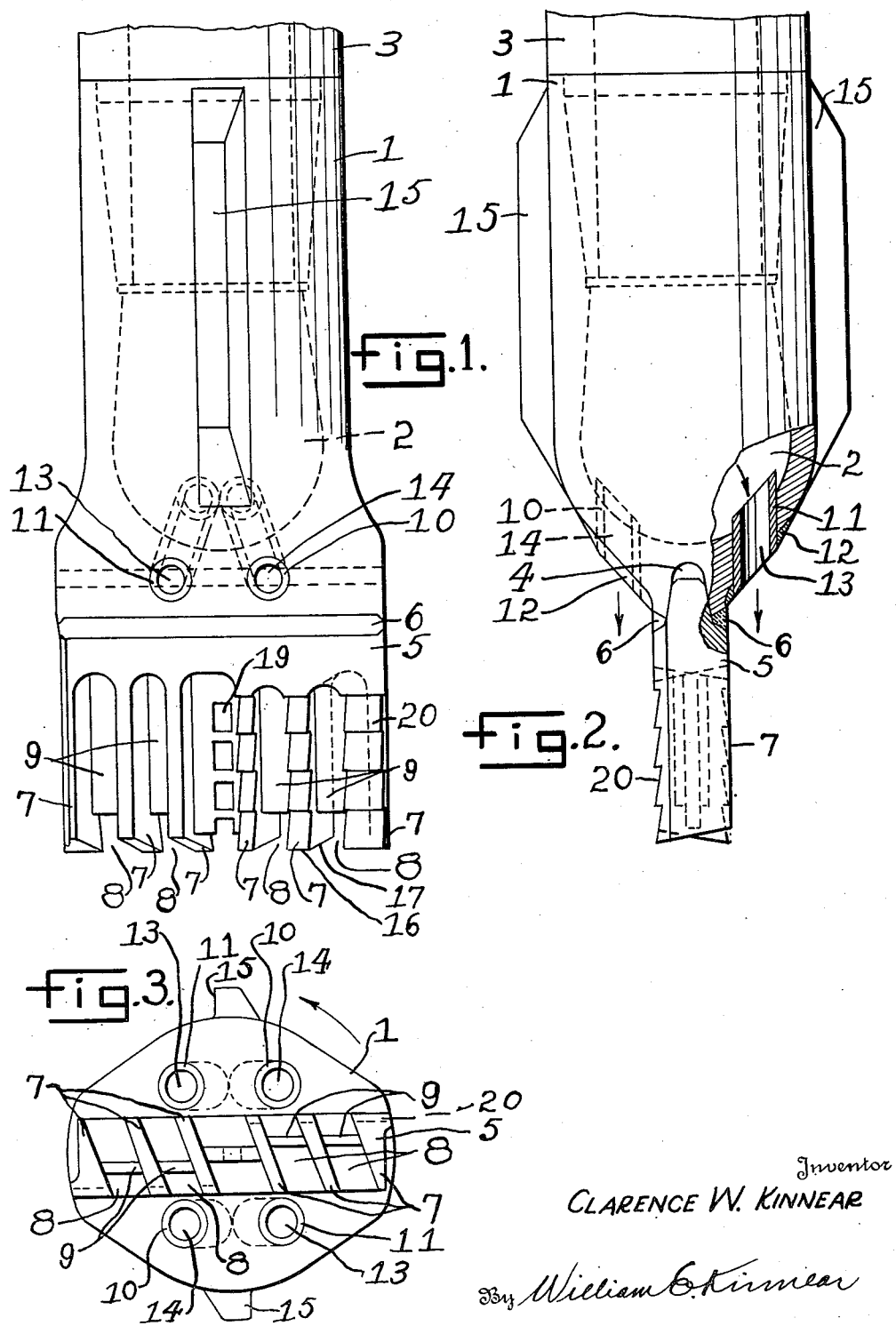

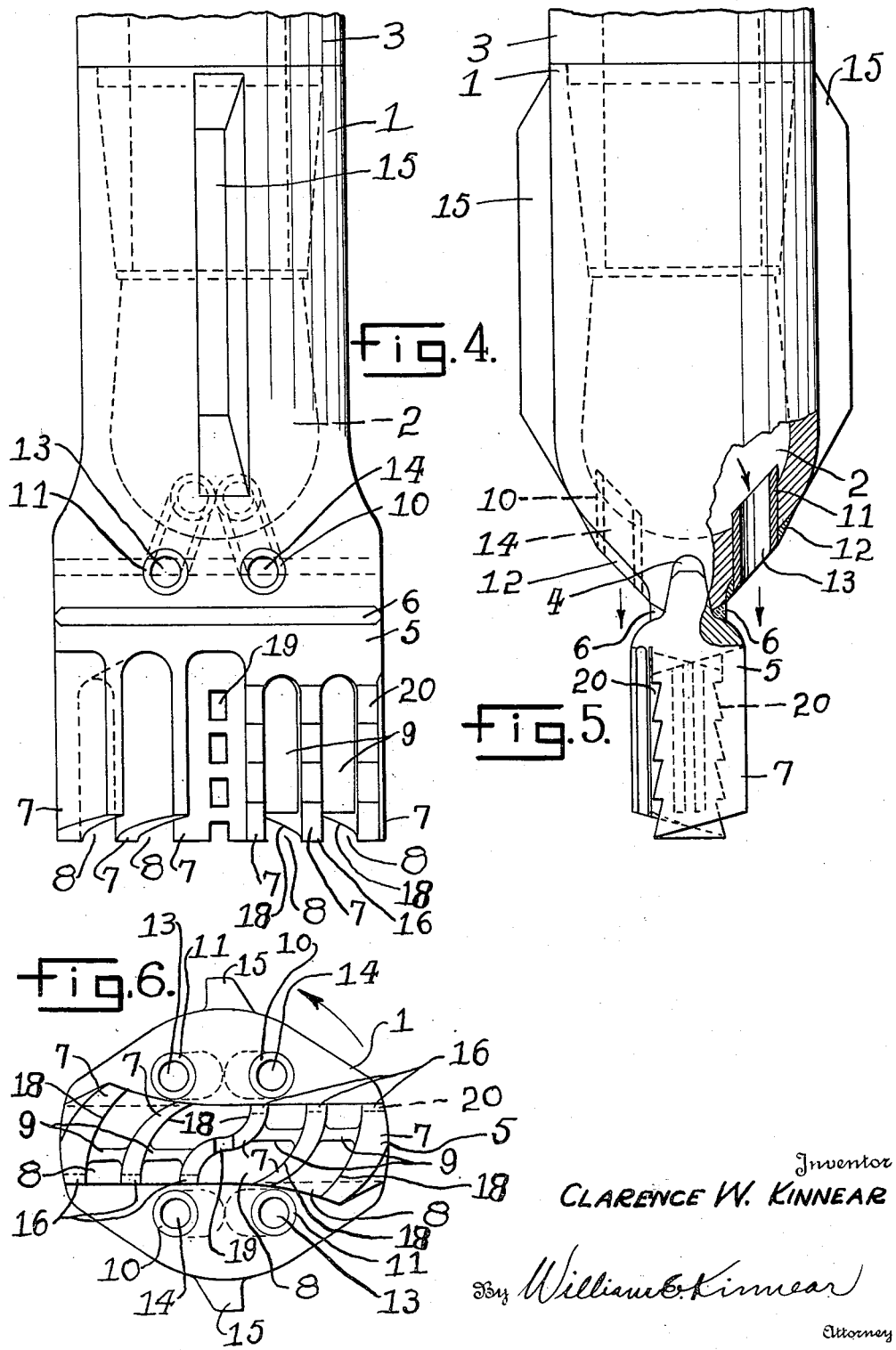

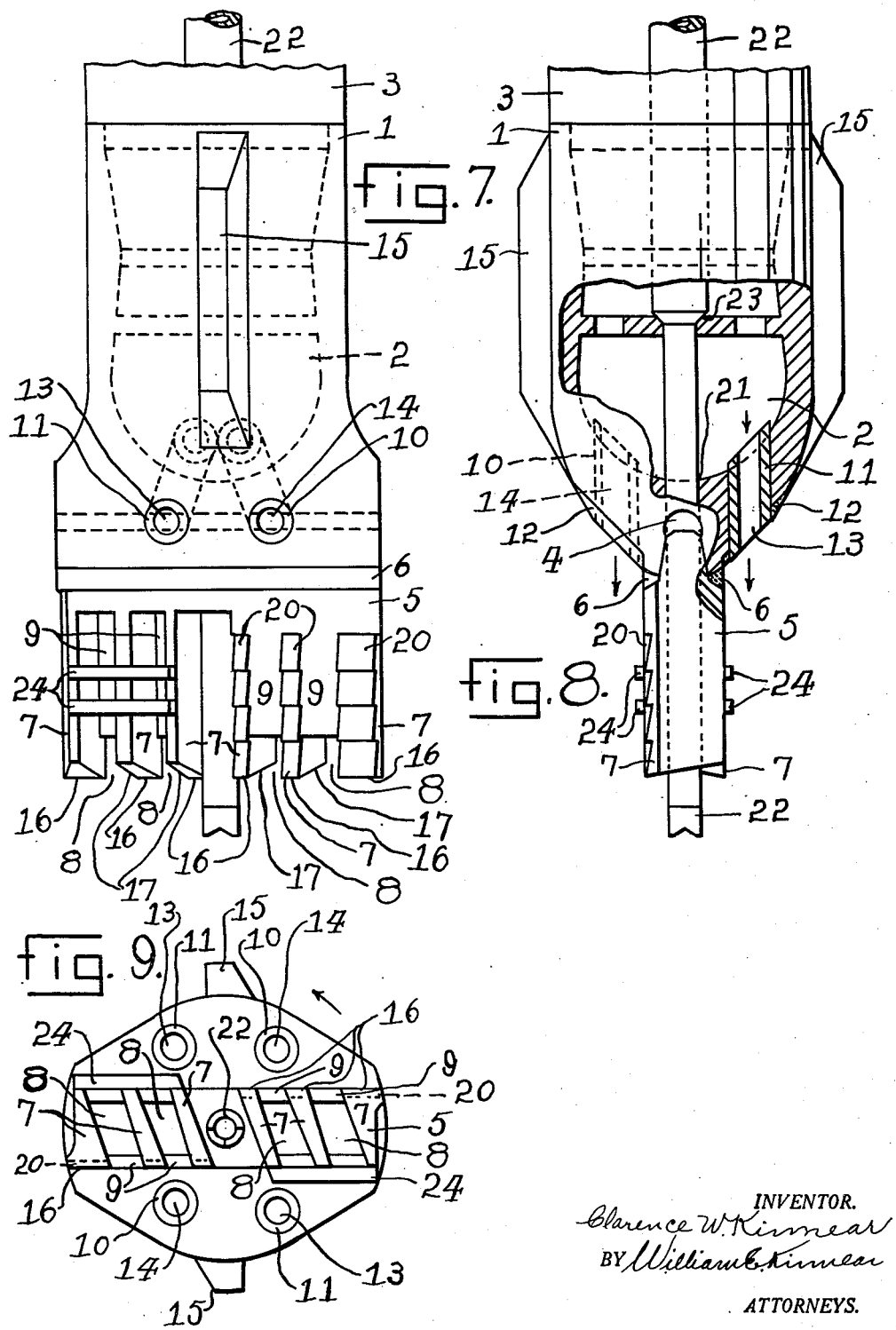

2,290,595

UNITED STATES PATENT OFFICE 2,290,595

ROTARY DRILL BIT

Clarence W. Kinnear, Beaumont, Tex., assignor of three-fourths to L. P. Kinnear, R. C. Kinnear, and W. E. Kinnear, all of Beaumont, Tex.

Application November 1, 1939, Serial No. 302,307

15 Claims. (Cl. 255—61)

This invention relates to new and useful improvements in a rotary drill bit.

An object of the invention is to provide a drill bit to be used in rotary drilling of oil wells or the like having cutting teeth on the lower end of the blade portion of the bit so arranged to cut substantially the entire surface encountered on the bottom of a well.

Another object of the invention is to provide a rotary drill bit of the type above referred to the toothed portions of which being so constructed and arranged that the front cutting edges of the teeth cut a portion of the hole being drilled and the side cutting edges of the cutting teeth cut the remaining portion of the hole being drilled.

A further object of the invention is to provide a rotary drill bit of the character described having the toothed portions arranged diagonally across the cutting blade and the slots between the teeth are enlarged progressively toward the back sides of the cutting teeth to relieve the cuttings passing between the teeth during drilling operations.

A further object of the invention is to provide a rotary drill bit of the character described having a plurality of cutting teeth on the lower end of the cutting blade spaced apart by webbed portions for supporting and strengthening the teeth whereby the teeth can be made of considerable length to provide a maximum sharp cutting edge for the entire length of the teeth.

A further object of the invention is to provide a bit of the character described having cutting teeth on the lower end of the cutting blade spaced apart by webbed portions and of such uniform dimensions and material that a wearing-away of the cutting edges of the teeth and webbed portions will substantially reproduce cutting edges of initial form and sharpness.

A further object of the invention is to provide a bit of the character described having fluid passages therethrough communicating with the interior of a drill stem whereby flushing fluid directed through said fluid passages is adapted to wash the front cutting edges of debris and to disintegrate the cuttings passing through the cutting teeth to the back of said cutting teeth.

A further object of the invention is to provide a bit of the character described having cutting teeth on the lower end of the blade portion of the bit running diagonally across said blade portion with the teeth having a plurality of cutting edges so arranged to cut substantially the entire surface of the bottom of the well being drilled.

These and other objects of the invention will in part be obvious and will in part be more fully disclosed in the accompanying drawings which show by way of illustration three embodiments of the invention, in which:

Fig. 1 is a vertical side view of the drill bit with a section of drill pipe connected at the upper end of the drill bit;

Fig. 2 is a vertical side view partly sectional of the drill bit turned at 90 degrees to Fig. 1;

Fig. 3 is a bottom plan view of Figs. 1 and 2;

Fig. 4 is a vertical side view of another embodiment of the drill bit;

Fig. 5 is a vertical side view partly sectional of the drill bit shown in Fig. 4, and turned at 90 degrees thereto;

Fig. 6 is a bottom plan view of the bit shown in Figs. 4 and 5.

Fig. 7 is a vertical side view of another embodiment of the drill bit showing longitudinal bore with core receiving barrel therethrough;

Fig. 8 is a vertical side view partly sectional of the drill bit shown in Fig. 7, and turned at 90 degrees thereto;

Fig. 9 is a bottom plan view of the drill bit shown in Figs. 7 and 8.

The invention will be better understood from a detailed description thereof wherein like numerals denote like parts in the accompanying drawings of the present embodiments of the invention.

The numeral 1 designates the body of the bit which has an interior cavity 2 formed in the upper end thereof said cavity being provided with a threaded portion to receive the lower end of a drill stem pipe 3. The bit body 1 has on its lower end a transverse socket 4 adapted to receive the upper end of a blade 5 said blade being rigidly connected to the bit body 1 by suitable weld as at 6 on each side of the socket to effect a strong union between the body and the blade.

The blade 5 has on its lower end a series of upwardly extending tooth portions 7 arranged diagonally across the blade 5 which are joined together with webbed portions 9 substantially of uniform thickness for supporting and strengthening the teeth 7. A portion of the bit blade 5 above the cutting edges of the teeth 7 is provided with upwardly facing shoulders which extend outwardly so that when said blade is fitted into the socket in the lower end of the bit body said upwardly facing shoulders on said bit blade or a part thereof extend outwardly beneath the downwardly facing forks of the furcated lower end of the body. When said blade is fitted into the socket in the lower end of the bit body the upwardly facing shoulders on the bit blade and the lower end of the forks of the furcated bit body are spaced apart so as to form opposing shoulders between the shoulder portions of the blade and the lower ends of the forked body and by depositing a welding material therebetween in known manner the blade is joined to the bit body to effect a strong union between the body and the blade and prevent said furcated ends of the body from spreading apart due to the fact that the body and blade become an integral piece when so welded together. Initially the webbed portions 9 do not extend to the lower ends of the teeth 7 thereby forms slots 8 between the teeth near their lower ends. Also inwardly extending longitudinal depressions are formed between said teeth in front and/or behind said webbed portions to allow a quick penetration of said blade in the earth substance being drilled.

The toothed portions of the blade 5 of the bit have on their lower ends front cutting edges 16 and side cutting edges 17. The front cutting edges of the teeth penetrate the formation being drilled as the bit and drill stem are revolved and fed downwardly during drilling operations and cut grooves so-to-speak on the bottom of the well and the side cutting edges of the teeth follow and cut the remaining portions of the bottom of the well left uncut by the front cutting edges of the teeth. This is accomplished due to the fact that the slots formed between the lower end of the teeth will permit the lower end of the teeth to penetrate the formation as the bit is fed downward thus leaving ridges between the grooves cut in the bottom of the well and these ridge portions are sliced off by the side cutting edges of the teeth. The ridge portions do not offer much resistance due to the fact that they are unsupported after the front cutting edges of the teeth have penetrated the formation and relieved that portion of the formation in the bottom of the well resulting in the grooves adjacent the uncut ridge portions.

The bit body 1 has diametrically opposed wash pipes 10—10 extending through the lower wall thereof communicating with the interior cavity 2 of said bit body for directing fluid to the front cutting faces of the teeth and oppositely disposed wash pipes 11—11 to the wash pipes 10—10 which are diametrically opposed to each other which likewise communicate with the interior cavity 2 of the bit body and extend through the lower wall of said bit body and are arranged for directing flushing fluid to the back sides of the cutting teeth to disintegrate and dissolve the cuttings which are cut by the side cutting edges 17 or 18 of the teeth that pass through the slots 8 to the back of the teeth. The wash pipes 10—10 and 11—11 are secured to the bit body by welding the same as shown at 12 and upon the wearing out of the wash pipes new ones are easily substituted by replacement.

The bit body 1 has reamer blades 15—15 formed on its outer periphery which are diametrically opposed to each other and are disposed at 90 degrees to the blade 5 attached to the lower end of said bit body as shown in the drawings, however, the position of the reamer blades may be placed at different positions with respect to said blade 5 to suit the kind of formation of the earth which may be encountered in different localities in drilling wells. The reamer blades are provided for reaming the hole drilled by the cutting blade 5 as well as guiding the bit for vertical drilling.

The Figs. 4, 5 and 6 show another embodiment of the invention in which the side cutting edges of the teeth are curved as at 18 and the teeth are thus curved about the longitudinal axis of the cutting blade 5. The side cutting edges 17 of the teeth as shown in Figs. 1, 2 and 3 are straight as compared to those shown in Figs. 4, 5 and 6. The webbed portions 9 between the teeth are of a thickness with respect to the tooth portions of the blade and of such material and hardness that the wearing-away of the webbed portions on their lower ends in proportion to the wearing-away of the cutting edges on the lower ends of the teeth will reproduce cutting edges on the teeth and webbed portions between the teeth of initial form and sharpness to greatly improve the cutting action of the tool and make it possible to drill with a sharp tool for the entire length of the teeth which may be made of considerable length due to the fact that they are strong when supported by the webbed portions arranged to strengthen the teeth and yet permitting the teeth to pierce or penetrate the formation or substance being drilled with the least possible resistance. The slots formed between the lower ends of the teeth are reproduced and being enlarged progressively toward the back of the cutting teeth the cutting action of the side cutting edges of the teeth are not impaired and thus prevents choking or clogging between the teeth to insure sufficient relief and clearance for the cuttings which pass through said slots to the back sides or faces of the cutting teeth from whence said cuttings are disintegrated and dissolved by the flushing fluid directed through the wash pipes 11—11 provided for such purposes.

The openings 19 formed along the central axis of the central web of the cutting blade 5 in Figs. 1 to 6 inclusive are provided for the purpose of a central crotch and Figs. 7 to 9 inclusive show the central crotch or opening separating each series of teeth located on each side of the vertical central axis of said blade. The indentures 20 are provided in the face of the teeth for the purpose of inserting hard metal to resist the abrasive action of the substance being drilled and are welded in place by any suitable composite rod or binding material well known in the art. The web portions may be proportioned in thickness to insure their wearing-away in proportion to the thickness of the cutting teeth and the slots formed between the teeth will gauge the depth of the penetration to a large extent and will determine the size of the cuttings passing through the slots. Also the teeth may be arranged so that the teeth will turn the cuttings outwardly as shown by Figs. 1 to 3 inclusive, whereas, the teeth may be arranged to turn the cuttings inwardly as shown by Figs. 4 to 6 inclusive. Figs. 7 to 9 inclusive show the teeth arranged diagonally across the blade to turn the cuttings outwardly as shown in Figs. 1 to 3 inclusive.

The inner cutting teeth on the blade portion on each side of the central axis thereof may be thinner with respect to the outer teeth.

The Figs. 7, 8 and 9 show another embodiment of the invention in which the side cutting edges of the teeth are arranged diagonally across said blade portion 5. A longitudinal bore 21 is formed through the body portion 1 and blade portion 5 to accommodate the core receiving barrel 22 of the removable type well known in the art. A seat 23 is provided on the interior of said body portion 1 to form a detent for said core barrel. On the back of the teeth supports or braces 24 are welded to said teeth to strengthen said teeth and are used in aid of the web portions 9 which are joined to the teeth to support the same.

It is obvious that many changes may be made in the details of construction and arrangement of the parts by one skilled in the art without departing from the scope of the invention.

Having thus described the invention, what I claim as new and desire to secure by Letters Patent is:

1. A rotary drill bit adapted to be attached to a drill stem including a body and a blade, said blade having a series of longitudinal extending teeth located on one side of the vertical central axis of said blade with cutting edges thereon, a plurality of the teeth of said series joined together by a thin webbed portion extending downwardly between said teeth, said webbed portion being of a thickness less than the distance between the front and back faces of said teeth and being a thin cutting member adapted to wear away during rotary drilling to progressively form a slot between said teeth and to produce a toothed blade with sharp cutting edges thereon for the entire length of said webbed portion, fluid passages extending through said body and communicating with the interior of said drill stem whereby flushing fluid forced through said drill stem is adapted to wash debris from said blade.

2. A rotary drill bit adapted to be attached to a drill stem including a body and a blade, said blade having a series of longitudinal extending teeth located on one side of the vertical central axis of said blade with cutting edges thereon, a plurality of the teeth of said series joined together by a thin webbed portion, said teeth extending upwardly above the lower end of said webbed portion, said webbed portion being of a thickness less than the distance between the front and back faces of said teeth and being a thin cutting member adapted to wear away during rotary drilling to progressively form a slot between said teeth and to produce a toothed blade with sharp cutting edges thereon for the entire length of said webbed portion, fluid passages extending through said body and communicating with the interior of said drill stem whereby flushing fluid forced through said drill stem is adapted to wash debris from said blade, an opening along the vertical central axis of said bit dividing said blade on the lower end thereof and adapted to impose the cutting duty on the divided portions of said blade.

3. A rotary drill bit adapted to be attached to a drill stem including a body and a blade, said blade having a series of longitudinal extending teeth located on one side of the vertical central axis of said blade with cutting edges thereon, a plurality of the teeth of said series joined together by a thin webbed portion extending downwardly between said teeth, said teeth extending below the lower end of said webbed portion, said webbed portion being of a thickness less than the distance between the front and back faces of said teeth and being a thin cutting member adapted to wear away during rotary drilling to progressively form a slot between said teeth and to produce a toothed blade with sharp cutting edges thereon for the entire length of said webbed portion, fluid passages extending through said body and communicating with the interior of said drill stem whereby flushing fluid forced through said drill stem is adapted to wash debris from said blade.

4. A rotary drill bit adapted to be attached to a drill stem including a body and a blade, said blade having a series of longitudinal extending teeth located on one side of the vertical central axis of said blade with cutting edges thereon, a plurality of the teeth of said series joined together by a thin webbed portion extending downwardly between said teeth, said webbed portion being of a thickness less than the distance between the front and back faces of said teeth and being a thin cutting member adapted to wear away during rotary drilling to progressively form a slot between said teeth and to produce a toothed blade with sharp cutting edges thereon for the entire length of said webbed portion, a longitudinal depression adjacent said webbed portion adapted to allow a quick penetration of said blade in the substance being drilled, fluid passages extending through said body and communicating with the interior of said drill stem whereby flushing fluid forced through said drill stem is adapted to wash debris from said blade.

5. A rotary drill bit adapted to be attached to a drill stem including a body and a blade, said blade having a series of longitudinal extending teeth located on one side of the vertical central axis of said blade with cutting edges thereon, a plurality of the teeth on said series joined together by a thin webbed portion extending downwardly between said teeth, said webbed portion being of a thickness less than the distance between the front and back faces of said teeth and being a thin cutting member adapted to wear away during rotary drilling to progressively form a slot between said teeth and to produce a toothed blade with sharp cutting edges thereon for the entire length of said webbed portion, a longitudinal depression on the rearward face of said blade behind said webbed portion between said teeth adapted to allow a quick penetration of said blade in the substance being drilled, fluid passages extending through said body and communicating with the interior of said drill stem whereby flushing fluid forced through said drill stem is adapted to wash debris from said blade.

6. A rotary drill bit adapted to be attached to a drill stem including a body and a blade, said blade having a series of longitudinal extending teeth located on one side of the vertical central axis of said blade with cutting edges thereon, a plurality of the teeth of said series joined together by a thin webbed portion extending downwardly between said teeth, said webbed portion being of a thickness less than the distance between the front and back faces of said teeth and being a thin cutting member adapted to wear away during rotary drilling to progressively form a slot between said teeth and to produce a toothed blade with sharp cutting edges thereon for the entire length of said webbed portion, a longitudinal depression on the forward face of said blade in front of said webbed portion between said teeth adapted to allow a quick penetration of said blade in the substance being drilled, fluid passages extending through said body and communicating with the interior of said drill stem whereby flushing fluid forced through said drill stem is adapted to wash debris from said blade.

7. A rotary drill bit adapted to be attached to a drill stem including a body and a blade, said blade having a series of longitudinal extending teeth located on one side of the vertical central axis of said blade with cutting edges thereon, a plurality of the teeth of said series joined together by a thin webbed portion extending downwardly between said teeth, said webbed portion being of a thickness less than the distance between the front and back faces of said teeth and being a thin cutting member adapted to wear away during rotary drilling to progressively form a slot between said teeth and to reproduce a toothed blade with sharp cutting edges thereon for the entire length of said webbed portion, longitudinal depressions in front and behind said webbed portion between said teeth adapted to allow a quick penetration of said blade in the substance being drilled, fluid passages extending through said body and communicating with the interior of said drill stem whereby flushing fluid forced through said drill stem is adapted to wash debris from said blade.

8. A rotary drill bit adapted to be attached to a drill stem including a body and a blade, said blade having a series of longitudinal extending teeth arranged diagonally on the said blade in horizontal cross section and located on each side of the vertical central axis of said blade with cutting edges thereon, a plurality of the teeth of each series joined together by a thin webbed portion extending downwardly between said teeth, said webbed portion being of a thickness less than the distance between the front and back faces of said teeth and being a thin cutting member adapted to wear away during rotary drilling to progressively form a slot between said teeth and to produce a toothed blade with sharp cutting edges thereon for the entire length of said webbed portion, fluid passages extending through said body and communicating with the interior of said drill stem whereby flushing fluid forced through said drill stem is adapted to wash debris from said blade.

9. A rotary drill bit adapted to be attached to a drill stem including a body and a blade, said body having a furcation on the lower end thereof forming a socket for the reception of said blade, said blade fitted into said socket, said blade being welded to said body on each side of said socket along the ends of said furcation to secure said blade to said body to effect a strong union between said blade and said body and for preventing said furcation from spreading apart, said blade having a series of longitudinal extending teeth located on each side of the vertical central axis of said blade with cutting edges thereon, a plurality of the teeth of each series joined together by a thin webbed portion extending downwardly between said teeth, said webbed portion being of a thickness less than the distance between the front and back faces of said teeth and being a thin cutting member adapted to wear away during rotary drilling to progressively form a slot between said teeth and to produce a toothed blade with sharp cutting edges thereon for the entire length of said webbed portion, fluid passages extending through said body and communicating with the interior of said drill stem whereby flushing fluid forced through said drill stem is adapted to wash debris from said blade.

10. A rotary drill bit adapted to be attached to a drill stem including a body and a blade, said body having a furcation on the lower end thereof forming a socket for the reception of said blade, said blade fitted into said socket, said blade being welded to said body on each side of said socket along the ends of said furcation to secure said blade to said body to effect a strong union between said blade and said body and for preventing said furcation from spreading apart, said blade having a series of longitudinal extending teeth located on each side of and spaced outwardly from the vertical central axis of said blade with cutting edges thereon, a plurality of the teeth of each series joined together by a thin webbed portion extending downwardly between said teeth, said webbed portion being of a thickness less than the distance between the front and back faces of said teeth and being a thin cutting member adapted to wear away during rotary drilling to progressively form a slot between said teeth and to produce a toothed blade with sharp cutting edges thereon for the entire length of said webbed portion, fluid passages extending through said body and spaced outwardly from said socket and communicating with the interior of said drill stem whereby flushing fluid forced through said drill stem is adapted to wash debris from said blade.

11. A rotary drill bit adapted to be attached to a drill stem including a body and a blade, said blade having a series of longitudinal extending teeth located on each side of and spaced outwardly from the vertical central axis of said blade with cutting edges thereon, a plurality of the teeth of each series joined together by a thin webbed portion extending downwardly between said teeth, said webbed portion being of a thickness less than the distance between the front and back faces of said teeth and being a thin cutting member adapted to wear away during rotary drilling to progressively form a slot between said teeth and to produce a toothed blade with sharp cutting edges thereon for the entire length of said webbed portion, hard metal having a high abrasive resistance secured to the front faces of said teeth to provide more durable cutting edges on said teeth, fluid passages extending through said body and communicating with the interior of said drill stem whereby flushing fluid forced through said drill stem is adapted to wash debris from said blade.

12. A rotary drill bit adapted to be attached to a drill stem including a body and a blade, said blade having a series of longitudinal extending teeth located on each side of and spaced outwardly from the vertical central axis of said blade with cutting edges thereon, a plurality of the teeth of each series joined together by a thin webbed portion extending downwardly between said teeth, said webbed portion being of a thickness less than the distance between the front and back faces of said teeth and being a thin cutting member adapted to wear away during rotary drilling to progressively form a slot between said teeth and to produce a toothed blade with sharp cutting edges thereon for the entire length of said webbed portion, indentures formed in the front faces of said teeth, hard metal having a high abrasive resistance adapted to be inserted into said indentures and welded therein to provide more durable cutting edges on said teeth, fluid passages extending through said body and communicating with the interior of said drill stem whereby flushing fluid forced through said drill stem is adapted to wash debris from said blade.

13. A rotary drill bit adapted to be attached to a drill stem including a body, said body having separate cutting means on each side of the vertical central axis of said body, one of said separate cutting means having a series of longitudinal extending teeth spaced outwardly from the vertical central axis of said body with cutting edges thereon, a plurality of the teeth of said series joined together by a thin webbed portion extending downwardly between said teeth, said webbed portion being of a thickness less than the distance between the forward and rearward faces of said teeth and being a thin cutting member adapted to wear away during rotary drilling to progressively form a slot between said teeth and to produce a toothed cutting means with sharp cutting edges thereon for the entire length of said webbed portion, a crotch extending along the vertical central axis of said bit dividing said separate cutting means and the upper end of said crotch being above the lower end of said webbed portion, fluid passages extending through said body and communicating with the interior of said drill stem whereby flushing fluid forced through said drill stem is adapted to wash debris from said cutting means.

14. A rotary drill bit adapted to be attached to a drill stem including a body and blade, said blade having a series of longitudinal extending teeth located on one side of the vertical central axis of said blade with cutting edges thereon, a plurality of the teeth of said series joined together by a thin webbed portion extending downwardly between said teeth, said webbed portion being of a thickness less than the distance between the front and back faces of said teeth and being a thin cutting member adapted to wear away during during rotary drilling to progressively form a slot between said teeth and to produce a toothed blade with sharp cutting edges thereon for the entire length of said webbed portion, a longitudinal bore through said body adapted to accommodate an inner core receiving barrel for the recovery of cores of the substance being drilled, fluid passages extending through said body and communicating with the interior of said drill stem whereby flushing fluid forced through said drill stem is adapted to wash debris from said blade.

15. A rotary drill bit adapted to be attached to a drill stem including a body and blade, said blade having a series of longitudinal extending teeth located on each side of the vertical central axis of said blade with cutting edges thereon, a plurality of the teeth of each series joined together by a thin webbed portion extending downwardly between said teeth, said webbed portion being of a thickness less than the distance between the front and back faces of said teeth and being a thin cutting member adapted to wear away during rotary drilling to progressively form a slot between said teeth and to produce a toothed blade with sharp cutting edges thereon for the entire length of said webbed portion, a longitudinal depression adjacent said webbed portion adapted to allow a quick penetration of said blade in the substance being drilled, a longitudinal bore through said body adapted to accommodate an inner core receiving barrel for the recovery of cores of the substance being drilled, fluid passages extending through said body and communicating with the interior of said drill stem whereby flushing fluid forced through said drill stem is adapted to wash debris from said blade.

CLARENCE W. KINNEAR.